Oct. 2, 1934.  L. BERTELE  1,975,678
OBJECTIVE
Filed July 3, 1933

Inventor:
Ludwig Bertele.
by:
Attorney.

Patented Oct. 2, 1934

1,975,678

UNITED STATES PATENT OFFICE 1,975,678

OBJECTIVE

Ludwig Bertele, Dresden, Germany, assignor to Zeiss Ikon, Aktiengesellschaft Dresden, Dresden, Germany Application July 3, 1933, Serial No. 678,817
In Germany July 8, 1932

1 Claim. (Cl. 88—57)

While endeavoring to improve the photographic objectives in such a manner that besides a high aperture of about 1:1.4 also a large picture field is obtained, it has been discovered that it is, indeed, possible to attain a high aperture, as well as a large picture angle, but there remain always comparatively great residual deficiencies, especially spherical, as well as comatic aberrations.

The object of the present invention is to obviate also said deficiencies, and I attain the object in view by providing in the last or rear component of the set of lenses constituting the objective a strongly curved cemented face which has a collective effect and the curvature of which is directed towards the film.

Figure 1:
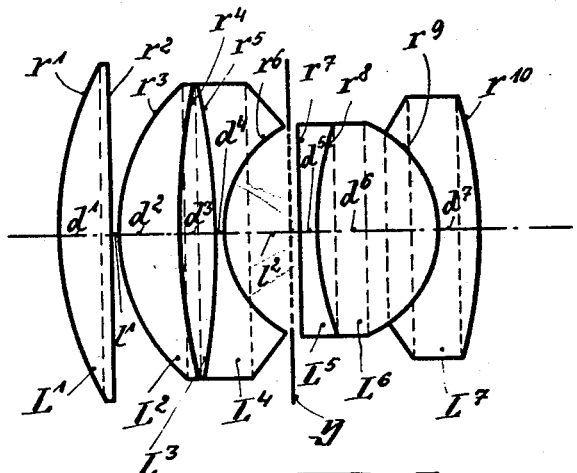
Figure 2:
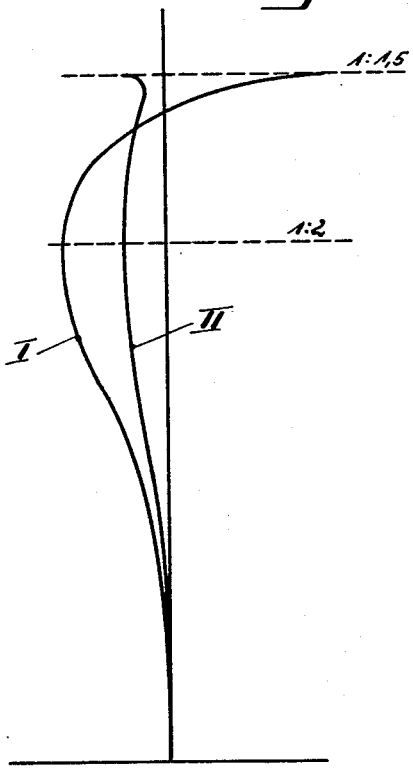

The invention is illustrated diagrammatically and by way of example in the accompanying drawing in which Figure 1 shows an arrangement and combination of lenses rendering the desired effect and constituting, therefore a solution of the problem, and Figure 2 shows the spherical aberation curves pertaining to the set of lenses shown in Fig. 1, the curve I having been attained without the strong influence produced by a very strong cementing surface, and the curve II having been obtained with the coaction of such a surface.

In Fig. 1 the set of lenses comprises a front component comprising, in turn, four lenses, and a rear component comprising, in turn, three lenses. The lenses constituting the front component are the plano-convex lens $L_1(d_1)$ having the convex face $r_1$ and the plane face $r_2$; the meniscus lens $L_2(d_2)$ having the convex face $r_3$ and the cemented concave face $r_4$; the biconvex lens $L_3(d_3)$ having the two cemented convex faces $r_4$ and $r_5$; and the biconcave lens $L_4(d_4)$ having also said cemented hollow face $r_5$ and the hollow face $r_6$ which is in contact with the air. The lens $L_1$ is made of a very strongly refractive kind of glass, as appears from the numerical statement $nd=1.6375$ in the example at the end of this specification, and the lens $L_4$ is made of a kind of glass that has likewise a very high refractive index, as appears from the numerical statement $nd=1.6890$ in said example, but besides, also its color separating capacity is very strong, as appears from the numerical statement $v=31$ in the said example. The lenses constituting the rear component are the plano-concave lens $L_5(d_5)$ having the plane face $r_7$ and the cemented hollow face $r_8$; the biconvex lens $L_6(d_6)$ having likewise the cemented convex face $r_8$ and the cemented convex face $r_9$; and finally, the meniscus lens $L_7(d_7)$ having likewise the cemented hollow face $r_9$ and the convex face $r_{10}$ which is in contact with the air. The cemented face $r_9$ is the strongly curved face that is directed towards the film.

The letter $d$ indicates the thickness of the lenses in the middle of the same.

The letter $y$ denotes an iris diaphragm which is located between the lenses $L_4$ and $L_5$.

The film must be assumed to be located right-hand from the objective.

The numerical data for the example shown in the drawing and described above are as follows:

1:1.5—$f=100$—picture angle about 42°

|  |  | $n_d$ | $v$ |
|---|---|---|---|
| $r_1+65.0$ | $10.5=d_1$ | 1.6375 | 56.1 |
| $r_2+416.77$ | $0.5=l_1$ |  |  |
| $r_3+37.26$ | $11.7=d_2$ | 1.6727 | 47.3 |
| $r_4+104.34$ | $7.6=d_3$ | 1.4675 | 65.7 |
| $r_5-247$ | $1.9=d_4$ | 1.6890 | 31.0 |
| $r_6+22.14$ | $13.9=l_2$ |  |  |
| $r_7+1904.0$ | $3.4=d_5$ | 1.5481 | 45.9 |
| $r_8+59.85$ | $22.4=d_6$ | 1.6578 | 51.2 |
| $r_9-22.06$ | $8.4=d_7$ | 1.5488 | 63.0 |
| $r_{10}-89.06$ |  |  |  |

I claim:

A great-rapidity objective having an aperture of about 1:1.4 and comprising seven lenses separated from one another by two air spaces and forming a front member ($L_1$) consisting of a very highly refractive glass; a rear member ($L_5$, $L_6$, $L_7$) comprising three lenses cemented together two of these three lenses being negative ones and the third being a positive one and enclosed between said two negative lenses, one of these latter and said positive lens having a cemented surface very strongly curved towards the film and having a radius of curvature which is smaller than one-half of the focal length of the objective; and a meniscal middle member comprising three lenses ($L_2$, $L_3$, $L_4$) cemented together, the strongly effective negative lens consisting of a glass having a highly refractive index and a strong color-separating capacity.

LUDWIG BERTELE.